W. C. Switzer,
Corn Planter.
No. 87,885.
Patented Mar. 16, 1869.

Witnesses:
E. Wolf
Wm. A. Morgan

Inventor:
C. Switzer.
attorneys

W. C. SWITZER, OF NELSONVILLE, TEXAS.

Letters Patent No. 87,885, dated March 16, 1869.

---

IMPROVEMENT IN COMBINED PLANTER AND CULTIVATOR.

---

The Schedule referred to in these Letters Patent and making part of the same.

---

*To all whom it may concern:*

Be it known that I, W. C. SWITZER, of Nelsonville, in the county of Austin, and State of Texas, have invented a new and useful Improvement in Combined Planter and Cultivator; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
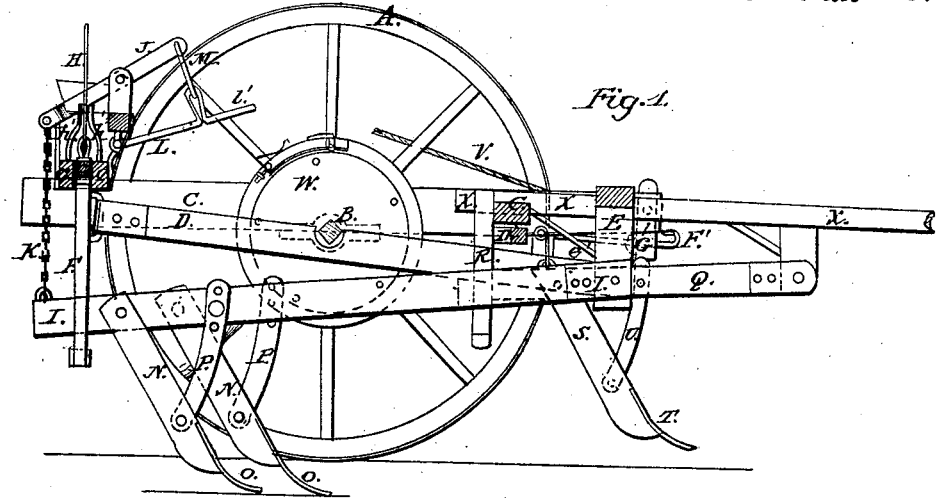
Figure 1 is a vertical section of my improved planter and cultivator, taken through the line *x x*, fig. 2.

My invention has for its object to furnish an improved machine, combining in itself most of the instruments required for preparing the ground, planting the seed, and cultivating the plants, and which may be easily adjusted for the various uses for which it may be required, doing its work in all cases thoroughly and well; and It consists in the construction and combination of various parts of the machine, as hereinafter more fully described.

A are the wheels, one of which runs loosely upon the axle B, and the other is rigidly connected with the said axle, so as to carry the axle with it in its revolution.

The axle B revolves in bearings, detachably secured to the side bars of the frame C by bolts and nuts, or by other conveniently-detachable means.

D are two longitudinal bars, placed, one upon each side of the middle part of the frame C, and the forward ends of which are pivoted to downwardly-projecting supports E, attached to the forward part of the frame C, and which are braced against the draught-strain by the brace-rods *e'*.

The rear ends of the bars D are pivoted to the central bars of the vertical rack bars F, the lower ends of each set of which are connected by a short horizontal bar, and the upper ends of which are attached to the sliding cross-bar G, which slides back and forth between the rear cross-bars of the frame C while resting upon the side bars of said frame.

The bar G is made in two parts, the adjacent ends of which parts being adjustably connected to each other by two plates, *g'*, placed, the one above and the other below the said ends of the said bar, and secured in place by bolts passing through holes in the said bars, and through slots in the said plates, so that the plows may be adjusted to run closer to or further from the plants, as may be desired.

H is a lever, pivoted to supports *h'*, attached to the frame C, and the lower end of which is pivoted to the sliding bar G. The upper end of the lever H extends up into such a position that it may be conveniently reached and operated by the driver, from his seat, to slide the bar G longitudinally, and thus guide the plows, in cultivating crooked rows of plants, or in avoiding irregular hills.

I are the plow-beams, two of which are used upon each side of the frame C, and the forward ends of which are pivoted to the supports E, one upon each side of each of the bars D.

The rear ends of the beams I pass between the vertical bars of the rack-frames F, by which the said beams are guided in their up-and-down movements, and by which the said beams are moved laterally, when required, for guiding the plows.

J are levers, which are pivoted to supports attached to the rear parts of the frame C, and the rear ends of which are branched, and are connected with the rear ends of the beams I by the connection-chains K, so that the plows may be conveniently raised from the ground when required.

L are the foot-levers, the rear ends of which are pivoted to supports attached to the rear part of the frame C, and the forward ends of which are rigidly connected to each other by the connecting-bar *l'*, the middle part of which is bent, or curved back, to keep it out of the way of the dropping-device, and, at the same time, to bring it into a convenient position for being operated by the driver with his feet.

Figure 2:
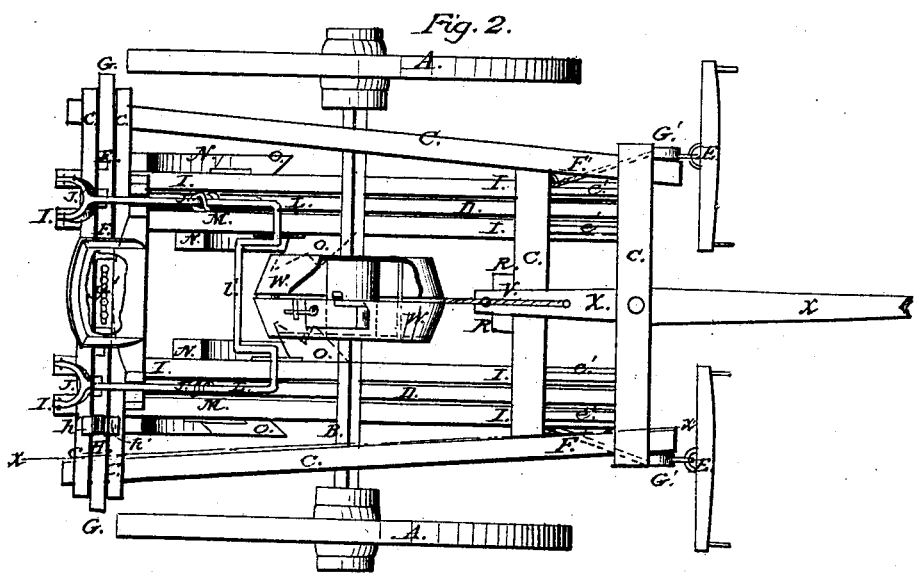
Figure 2 is a top or plan view of the same, parts being broken away to show the construction.
Figure 4:
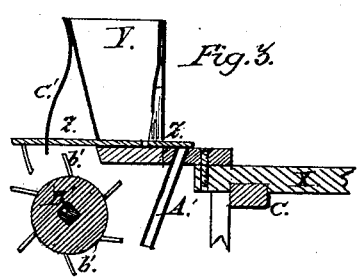
Figure 4 represents one of the detachable sweeps.

The levers J are connected with the foot-levers L by the connecting-bars or chains M, as shown in figs. 1 and 2.

N are the plow-standards, to the lower ends of which are attached the plows O, and the upper ends of which are detachably pivoted to the beams I.

The draught-strain upon the plow-standards N is sustained by the brace-bars P, the lower ends of which are pivoted to the lower part of the said standards N, and the upper ends of which are secured to the beams I by bolts, which pass through holes in the beams I, and through one or the other of the holes in the upper ends of the brace-bars P, according to the required adjustment of the plows.

The plows O may be large or small shovel-plows, side plows, or sweeps, according to the particular use to which the machine is to be applied.

Q is a plow-beam, the forward end of which is pivoted to a support attached to the tongue of the machine, and the rear end of which works between the vertical bars of a rack, R, attached to the rear end of the tongue.

To the beam Q is pivoted the upper end of the plow-standard S, to the lower end of which is attached a plow, T, and the draught-strain upon which is sustained by the brace-bar U, the lower end of which is pivoted to the lower part of the standard S, and the upper end of which is pivoted to the beam Q.

V is a cord or chain, one end of which is attached to the plow-beam Q, and which passes up through a hole formed in the rear end of the tongue, and thence extends back toward the axle, so that it may be conveniently reached and operated by the driver, when required to raise the plow from the ground.

The plow Q S T U is only used for planting; and when the machine is to be used for cultivating the plants, it should be detached.

W is the device for dropping the cotton-seed, which consists of a casing, or seed-box, in the shape of two pans attached, face to face, to the ends of a hub, in such positions that the edges of their rims may be at such a distance apart as to allow the cotton-seed to pass out between them.

The seed-box W is provided with rods, extending across its interior, to keep the seeds stirred up, and with a small door, through which the seed may be introduced.

The hub of the wheel W is keyed, or otherwise detachably secured to the axle B, so that it may be conveniently removed when required.

When the machine is to be used for planting corn, the dropping-device W is removed, and a corn-dropping device attached to the machine.

X is the tongue of the machine, which is securely attached to the forward part of the frame C.

Figure 3:
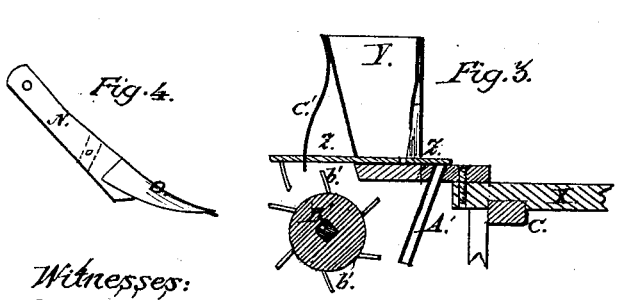
Figure 3 is a detail sectional view of the same, showing the device for dropping corn.
Figure 5:
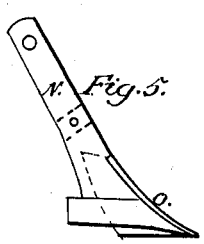
Figure 5 represents one of the detachable turn-plows.

Y is the seed-box of the corn-dropping device, the bottom of which is detachably secured to the rear end of the tongue X, by screws or bolts, as shown in fig. 3.

Z is a plate which slides forward and back, in the bottom of the seed-box Y, and which has a hole formed in it of sufficient size to hold enough seed to form a hill. As the plate Z is moved forward, it carries the seed with it to the spout A', by which it is conducted to the ground.

B' is a hub, detachably secured to the axle B, in the rear of the seed-box Y, and which is provided with arms, or flanges b', which, as the machine advances, successively strike against a downwardly-projecting flange, or arm, attached to the under side of the rear part of the plate Z, and move it forward to drop the seed. The plate Z is drawn back, when released from the arms b', by the spring c', one end of which is attached to the seed-box Y, and the other end of which passes through a hole formed in, or is otherwise connected with the plate Z.

The arms, or flanges b', are detachable, so that their number may be increased or diminished, according to the required distance apart of the hills.

It should be observed that when the machine is used for plowing, bedding, or cultivating, all or part of the plows I N P O may be used, as circumstances may render advisable.

It should also be observed that the plows may be adjusted, when side plows are used, to throw the dirt toward or from the plants, as may be desired.

D' is the double-tree, which is pivoted to the frame C and tongue X, either or both, in such a position as to be in the rear of the forward end of the frame C.

E' are the whiffle-trees, which are connected to the ends of the double-tree D' by the connecting-bars F', and which are kept from sagging, or dropping down, by the supports G', which are pivoted to the forward part of the frame C.

Having thus described my invention,

I claim as new, and desire to secure by Letters Patent—

1. The dropping-device W, constructed and operating substantially as herein shown and described, in combination with the axle B, plows I N P O, and plow Q S U T, as and for the purpose set forth.

2. The dropping-device Y Z A' B' b' C', constructed and operating substantially as herein shown and described, in combination with the axle B, plows I N P O, and plow Q S U T, as and for the purpose set forth.

3. The combination and arrangement of the plow-beams I, two or more plow-standards N, brace-bars P, supports E, racks F, adjustable sliding bar G, and longitudinal bars D, with each other and with the frame C, substantially as herein shown and described, and for the purpose set forth.

4. The combination and arrangement of the foot-lever or levers I l', connecting-rods or chains M, levers J, and connecting-chains K, with each other and with the plow-beams I and frame C, substantially as herein shown and described, and for the purpose set forth.

W. C. SWITZER.

Witnesses:
WM. THOMPSON,
ELIAS ELLIOTT.